(12) United States Patent
Ratliff

(10) Patent No.: US 12,193,409 B1
(45) Date of Patent: Jan. 14, 2025

(54) PET GROOMING RESTRAINING DEVICE

(71) Applicant: Troy Ratliff, Owensboro, KY (US)

(72) Inventor: Troy Ratliff, Owensboro, KY (US)

( * ) Notice: Subject to any disclaimer, the term of this patent is extended or adjusted under 35 U.S.C. 154(b) by 0 days.

(21) Appl. No.: 18/227,461

(22) Filed: Jul. 28, 2023

Related U.S. Application Data

(63) Continuation-in-part of application No. 17/717,973, filed on Apr. 11, 2022, now Pat. No. 11,950,570.

(60) Provisional application No. 63/393,674, filed on Jul. 29, 2022, provisional application No. 63/174,492, filed on Apr. 13, 2021.

(51) Int. Cl.
*A01K 15/04* (2006.01)
*A01K 27/00* (2006.01)
*A01K 13/00* (2006.01)

(52) U.S. Cl.
CPC .............. *A01K 15/04* (2013.01); *A01K 13/00* (2013.01)

(58) Field of Classification Search
CPC ...... A01K 15/04; A01K 27/00; A01K 27/003; A01K 13/00; A61D 3/00
See application file for complete search history.

(56) References Cited

U.S. PATENT DOCUMENTS

| | | | |
|---|---|---|---|
| 4,483,275 A * | 11/1984 | De Groot | A01K 27/002 119/793 |
| 4,828,210 A | 5/1989 | Anderson et al. | |
| 5,243,931 A | 9/1993 | McDonough | |
| 6,460,488 B1 | 10/2002 | Manzella et al. | |
| 6,662,753 B1 | 12/2003 | Sporn | |
| 6,694,921 B2 | 2/2004 | Emerick | |
| 7,806,089 B2 | 10/2010 | Walker-Indyke et al. | |
| 7,984,697 B2 | 7/2011 | Grbic | |
| 8,281,748 B2 | 10/2012 | Elkins et al. | |
| 8,365,685 B2 | 2/2013 | Simons | |
| 8,925,496 B2 | 1/2015 | Simons | |
| 9,538,723 B2 | 1/2017 | Simons | |
| 9,832,977 B2 | 12/2017 | Smith | |
| 10,051,837 B2 | 8/2018 | Hickman et al. | |
| D828,648 S | 9/2018 | Cook | |
| 10,143,182 B1 | 12/2018 | Ferro | |
| D841,261 S | 2/2019 | Backus et al. | |
| 10,321,661 B2 | 6/2019 | Kath | |
| 10,398,132 B2 | 9/2019 | Louro | |
| 10,448,617 B2 | 10/2019 | Yun | |
| 10,701,903 B1 | 7/2020 | Cesta | |
| 10,721,911 B2 | 7/2020 | Cassell | |
| 10,757,920 B2 | 9/2020 | Flippen | |
| 10,918,089 B2 | 2/2021 | Cesta | |
| 11,324,201 B1 | 5/2022 | Benishai et al. | |
| 11,375,686 B2 | 7/2022 | Fofana | |
| 11,793,166 B2 * | 10/2023 | DeLuccia | A01K 27/003 |
| 2003/0221634 A1 | 12/2003 | Emerick | |
| 2005/0005875 A1 | 1/2005 | Suggs | |
| 2016/0135430 A1 | 5/2016 | Noonan | |
| 2017/0118954 A1 | 5/2017 | Hickman et al. | |
| 2017/0181405 A1 | 6/2017 | Tower | |
| 2019/0230898 A1 | 8/2019 | Cassell | |
| 2020/0296934 A1 | 9/2020 | Cesta | |

(Continued)

*Primary Examiner* — Kristen C Hayes
(74) *Attorney, Agent, or Firm* — Law Office of J. L. Simunic; Joan Simunic

(57) ABSTRACT

The present development is a device to restrain an animal during grooming. The device comprises a semi-flexible band or sling attached to a strap, wherein the strap is adapted to attach to a grooming table.

11 Claims, 3 Drawing Sheets

(56) References Cited

U.S. PATENT DOCUMENTS

| | | |
|---|---|---|
| 2020/0344975 A1 | 11/2020 | Kwon |
| 2021/0131623 A1 | 5/2021 | Scroggins |
| 2021/0307296 A1 | 10/2021 | Lui |
| 2021/0378207 A1 | 12/2021 | Hall |
| 2023/0413783 A1* | 12/2023 | DeLuccia ............ A01K 27/003 |

* cited by examiner

PET GROOMING RESTRAINING DEVICE

CROSS-REFERENCE TO PRIOR APPLICATIONS

The present application claims priority to U.S. patent application Ser. No. 17/717,973, currently pending, filed 11 Apr. 2022 and to U.S. Patent Application 63/393,674, filed 29 Jul. 2022, and both applications are incorporated in their entireties by reference.

GOVERNMENT INTEREST

The invention was made without government support.

FIELD OF THE INVENTION

The invention relates generally to animal grooming devices, and more specifically to a sling to support an animal for bathing and grooming.

BACKGROUND OF THE INVENTION

In order to maintain control over a pet, such as a dog, during the grooming process, it is common to secure the pet with a grooming loop. A grooming loop normally includes a loop at one end that is secured around the pet being groomed and a hook at an opposing end to allow a groomer to secure the grooming loop and pet to a grooming table or similar workstation. However, the typical grooming loop secures the animal only around the neck. If an animal is restless and/or fidgety, the grooming loop cannot help to further secure the animal.

Thus, it would be beneficial to a groomer to have a device that could restrict the movement of the animal during the grooming process.

SUMMARY OF THE PRESENT INVENTION

The present development is a device to restrain an animal during grooming. The device comprises a semi-flexible band or sling attached to a strap, wherein the strap is adapted to attach to a grooming table.

DETAILED DESCRIPTION OF THE FIGURES

DETAILED DESCRIPTION OF THE PRESENT DEVELOPMENT

Figure 1:
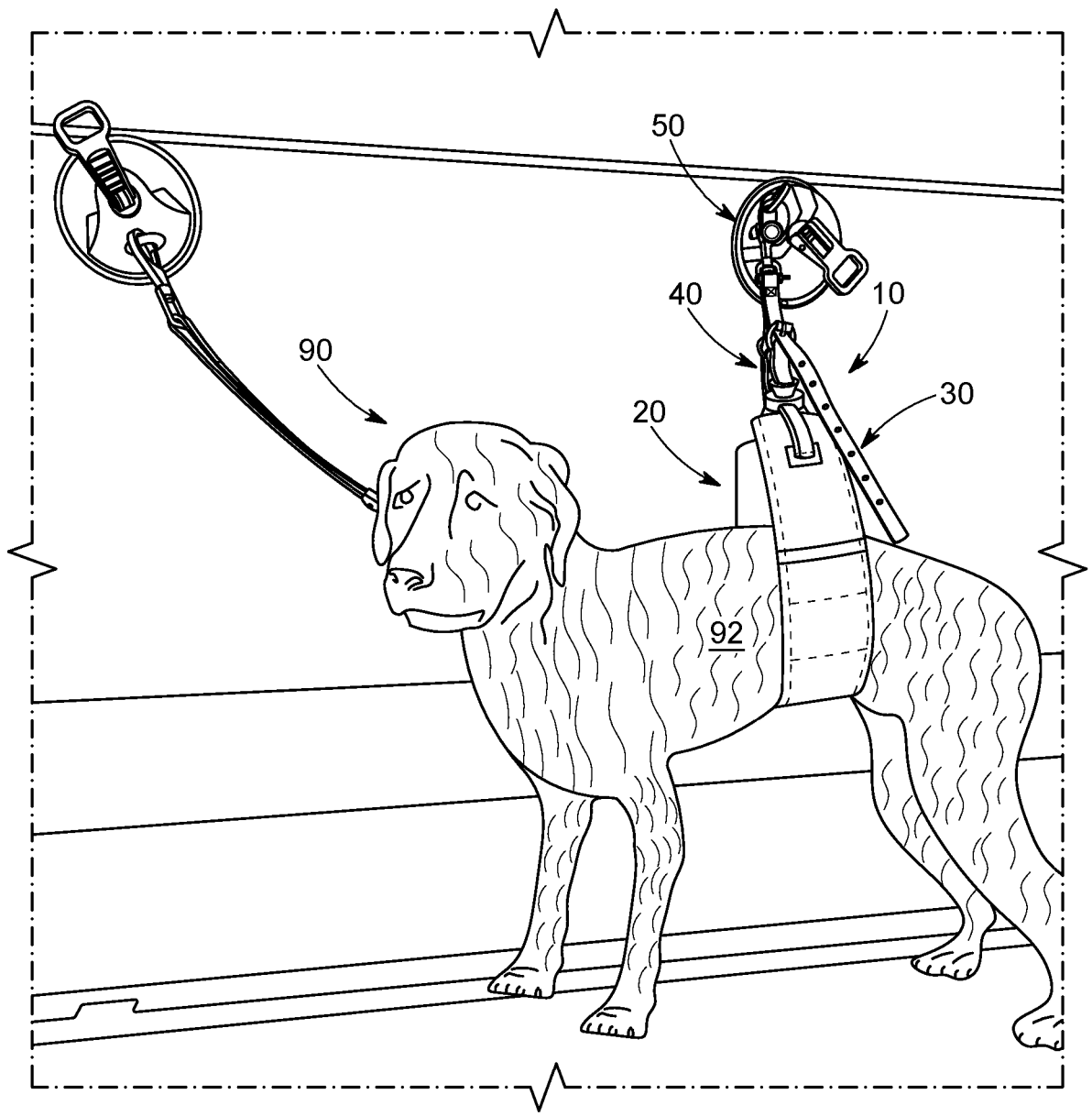
FIG. 1 shows the pet grooming restraining device of the present invention in use by a groomer.
Figure 2:
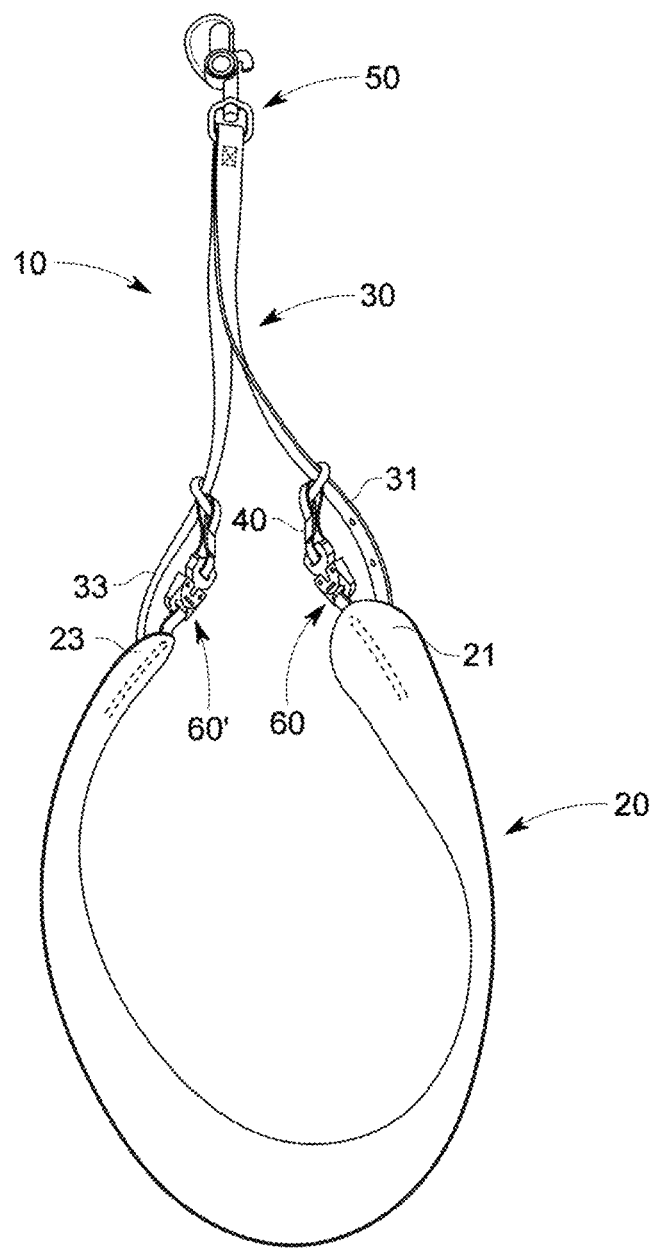
FIG. 2 is a perspective view of the pet grooming restraining device of the present invention.

The present development is pet grooming restraining device to support an animal during the grooming process. As shown in FIGS. 1-5, the device 10 comprises a band or sling 20 reversibly attached to a strap 30, wherein the strap is adapted to attach to a grooming table. More specifically, as shown in FIGS. 1 and 2, the device 10 comprises the band or sling 20, at least one linking unit 40, the strap 30, and a bolt snap 50.

The band or sling 20 has a first end 21 and a second end 23. The band 20 is a strip of material long enough to comfortably wrap around the torso 92 of an animal 90 and wide enough to secure the animal 90. In a preferred embodiment, the band 20 is from about 15" long to about 20" long and from about 2.0" wide to about 4.0" wide. The band 20 is preferably made from a material that can withstand exposure to water and soaps, such as, but not limited to nylon, leather, Biothane®, polyester, TPU-coated polyester, PVC-coated polyester, rubber, jute, polypropylene, cotton, and combinations thereof. A first end 61 of a release buckle 60 is fixedly attached to the first end 21 of the band 20. Optionally, a first end 61' of a second release buckle 60' is fixedly attached to the second end 23 of the band 20.

The strap 30 is a piece of material having a first end 31 and a second end 33, and at least one hole 32 punched at a predetermined position along the length of the strap 30. The bolt snap 50, having a latch 52 and an eye 54, is positioned on the strap 30 by having the strap 30 pass through the eye 54 of the bolt snap 50. An exemplary bolt snap 50 is described in U.S. Pat. No. 17,717,973, which is incorporated herein in its entirety by reference Optionally, the strap 30 is attached to itself, as shown in FIG. 2, to hold the bolt snap 50 in a fixed position along the strap 30. The strap 30 is preferably made from a material that can withstand exposure to water and soaps, such as, but not limited to nylon, leather, Biothane®, polyester, TPU-coated polyester, PVC-coated polyester, rubber, jute, polypropylene, cotton, and combinations thereof.

Figure 3:
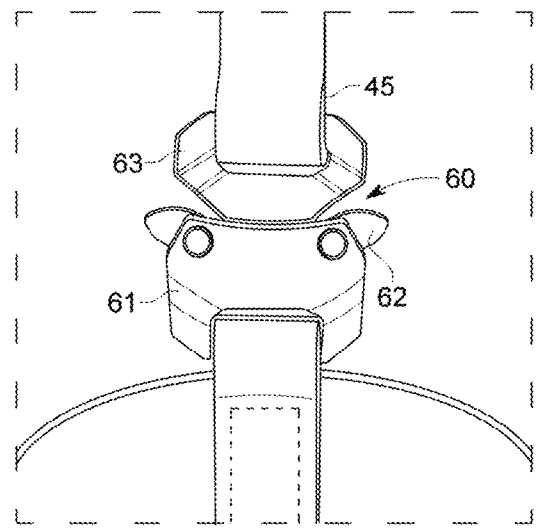
FIG. 3 is a front view of the release buckle of the pet grooming restraining device of FIG. 2.
Figure 5:
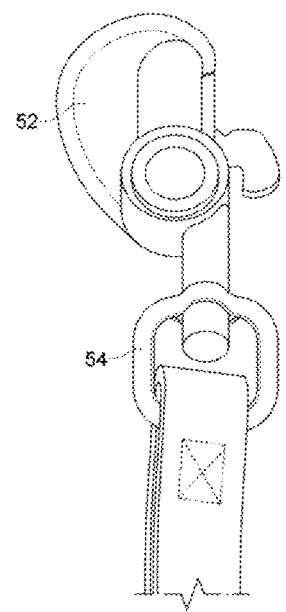
Figure 4:
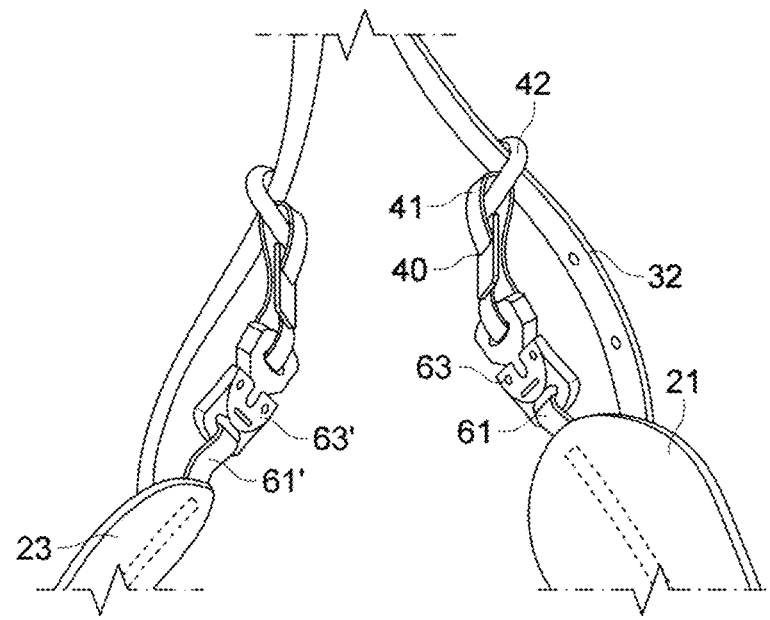
FIG. 4 is a perspective view of the ends of the band of the pet grooming restraining device of FIG. 2 and the ends of the strap of the pet grooming restraining device of FIG. 2 when in use by a groomer; and, FIG. 5 is a side view of the latch of the pet grooming restraining device of FIG. 2.

The linking unit 40 comprises a strap with a first end 41 and a second end 45, as shown in FIGS. 3 and 4. To the first end 41 is fixedly attached a standard belt buckle comprising a frame 42 and a prong 44. A second end 63 of the release buckle 60 is fixedly attached to the second end 45 of the linking unit 40. The strap 30 reversibly attaches to the linking unit 40 by having the prong 44 project through the hole 32 in the strap 30, as is known in the art.

Release buckles 60, such as shown in FIG. 3, are generally known in the art, and are designed to allow the user to snap the first end 61 of the buckle into the second end 63 of the buckle to cause the ends 61, 63 to reversibly link or latch together. The user can release the link by compressing a predetermined segment of the buckle 62.

To use the device 10 of the present invention, it is recommended that the bolt snap 50 be secured to a hook on a grooming table, such that the strap 30 can extend toward the grooming table. One linking unit 40 is secured to the first end 31 of the strap 30 and a second linking unit 40' is secured to the second end 33 of the strap 30. The band 20 is positioned around the torso 92 of the animal 90, as shown in FIG. 1, and the first end 61, 61' of each release buckle 60,60' is reversibly attached to its complementary end 63, 63' on each linking unit 40, 40'. Once the release buckles are secure, the animal 90 will have limited mobility during the grooming process.

In an alternative embodiment, not shown, the second end 23 of the band 20 may be fixedly attached to second end 33 of the strap 30. In this embodiment, the band 20 would be connected to the strap 30, and the pet grooming restraining device 10 would separate to wrap around the animal's torso 92 by use of a release buckle 60 attached to the first end 21 of the band 20 and the first end 31 of the strap 30.

Unless defined otherwise, all technical and scientific terms used herein have the same meaning as commonly understood by one of ordinary skill in the art to which the presently disclosed subject matter pertains. Representative methods, devices, and materials are described herein, but are not intended to be limiting unless so noted.

The terms "a", "an", and "the" refer to "one or more" when used in the subject specification, including the claims. Unless otherwise indicated, all numbers expressing quantities of components, conditions, and otherwise used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, or percentage can encompass variations of, in some embodiments ±20%, in some embodiments ±10%, in some embodiments ±5%, in some embodiments ±1%, in some embodiments ±0.5%, and in some embodiments to ±0.1%, from the specified amount, as such variations are appropriate in the disclosed application.

It is understood that, in light of a reading of the foregoing description, those with ordinary skill in the art will be able to make changes and modifications to the present invention without departing from the spirit or scope of the invention, as defined herein. For example, those skilled in the art may substitute materials supplied by different manufacturers than specified herein without altering the scope of the present invention.

What is claimed is:

1. A device to restrain an animal during grooming, wherein the device comprises (a) a flexible band defining a first end and a second end, (b) at least one linking unit, (c) a strap defining a first end and a second end, and (d) a bolt snap, and wherein the bolt snap is affixed to the strap between the first end and the second end, and the linking unit is attached to the first end of the strap, and the first end of the band is attached to the linking unit and the second end of the band is attached to the second end of the strap.

2. The device of claim 1 wherein the flexible band is from about 15" long to about 20" long and from about 2.0" wide to about 4.0" wide.

3. The device of claim 1 wherein the flexible band is made from a material that can withstand exposure to water and soaps.

4. The device of claim 1 wherein the flexible band is made from nylon, leather, polyester, TPU-coated polyester, PVC-coated polyester, rubber, jute, polypropylene, cotton, and combinations thereof.

5. The device of claim 1 wherein the strap defines a length, and the strap has at least one hole punched at a predetermined position along the length of the strap.

6. The device of claim 1 wherein the strap is made from a material that can withstand exposure to water and soaps.

7. The device of claim 6 wherein the strap is made from nylon, leather, polyester, TPU-coated polyester, PVC-coated polyester, rubber, jute, polypropylene, cotton, and combinations thereof.

8. The device of claim 1 wherein the bolt snap has a latch and an eye, and the bolt snap is positioned on the strap by having the strap pass through the eye of the bolt snap.

9. The device of claim 1 wherein the linking unit comprises a strap with a first end and a second end.

10. The device of claim 1 wherein the linking unit reversibly attaches to the strap.

11. The device of claim 1 further comprising a second linking unit wherein the second linking unit is positioned between the second end of the band and the second end of the strap.

* * * * *